May 22, 1956 D. Q. FULLER 2,747,165

TRANSFORMERS AND NETWORKS FOR TAPPING OR BRANCHING CABLES CARRYING TWO OR MORE FREQUENCY BANDS

Filed July 3, 1950

Inventor
Dennis Q. Fuller
By
Emery, Holcombe & Blair
Attorney

United States Patent Office 2,747,165

Patented May 22, 1956

2,747,165

TRANSFORMERS AND NETWORKS FOR TAPPING OR BRANCHING CABLES CARRYING TWO OR MORE FREQUENCY BANDS

Dennis Quintrell Fuller, Cambridge, England, assignor to Pye Limited, Cambridge, England, a British company Application July 3, 1950, Serial No. 171,989

Claims priority, application Great Britain July 7, 1949

4 Claims. (Cl. 333—5)

The present invention relates to transformers and networks for tapping or branching cables carrying two or more frequency bands and is especially applicable to systems for distributing both audio and carrier frequency signals, for instance in public relay systems, such as systems in which sound and television programmes are relayed by a common cable, though there are other applications in which the method may advantageously be used.

In relay systems of the types mentioned it may be necessary to transmit an audio frequency programme and a carrier signal along a common balanced twin line, or possibly two carrier signals substantially differing in frequency, and at intervals along the line take off a portion of the power available for one or both signals. For the audio signal it is customary to connect the tapping line directly to the main line since the matching of the cable is not of first importance at these frequencies, and the ratio of power tapped to power available on the main line can be adjusted at the remote end of the tapping line by a transformer or other commonly used devices. With the high frequency carrier, however, it may be required to take a small portion of the power available without substantially mismatching the line and thus causing standing waves and reflections as would be the case if the tapping line were directly connected to the main line.

According to the present invention a network for this purpose comprises an impedance for separating the high and low frequency bands of the combined signal by offering a low impedance path to the high frequency signals while offering a high impedance path to the lower frequency signals, and a transformer effective on the higher frequency signals for which said impedance offers a low impedance path, having its primary connected in series with said separating impedance, the desired signals being obtained across said separating impedance and the secondary winding of the transformer. Thus in order to tap from a main cable a fraction of a higher frequency signal and the full power of a lower frequency signal such as an audio frequency signal, the network may comprise a transformer effective at said higher frequency for providing the desired fraction of the higher frequency signal, the primary of said transformer being connected to the main line through a blocking condenser offering a low impedance at the high frequency but a greater impedance at the lower frequency and the primary and secondary windings being connected together so that the desired signals may be obtained across said secondary winding and said condenser.

As the main and tapping cables are balanced, the transformers may advantageously consist of two balanced halves.

In order that the invention may be more fully understood, various embodiments as applied to the tapping and branching of cables carrying an audio frequency and a carrier frequency signal are hereinafter described with reference to the accompanying drawings, in which.

Figure 1:
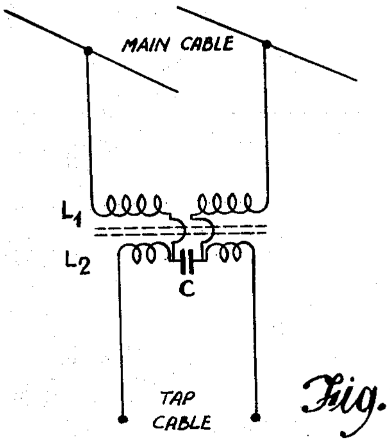
Fig. 1 shows an application of the invention to an arrangement employing balanced cables in which it is desired that the full audio frequency power and a fraction of the carrier frequency power should appear on the tapping cable.

Referring to Fig. 1, this arrangement constitutes a convenient means for achieving the direct connection for the audio or relatively low frequency carrier in combination with any required stepdown ratio for the high frequency carrier, and also provides a convenient symmetrical circuit design with little tendency to unbalance the main or tapping cable. The circuit consists of a carrier frequency transformer of the desired ratio with primary and secondary windings $L_1$ and $L_2$ broken at the middle and wound on a common core indicated in dashed lines. The break is re-connected via a common condenser C for both primary and secondary, the impedance of the condenser being negligible at the carrier frequencies which it is desired to transform but presenting a high impedance to the audio frequency signal. As the inductances of $L_1$ and $L_2$ are small compared with the audio termination of the tapping cable, the audio power on the main cable is transferred substantially unchanged to the tapping cable, but the carrier power is transformed down by the desired ratio.

Figure 2:
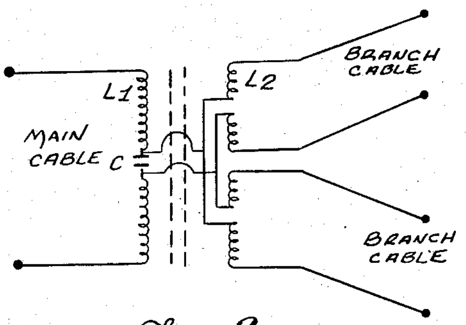
Fig. 2 shows the application of the invention to the branching of a balanced main cable into two balanced branch cables each of which receives the full audio frequency power and half the carrier frequency power of the main cable.

Another application of this circuit with many potential uses in the relay field is for splitting a main feed cable into two or more branch cables. Naturally in this case if the cable is also carrying a H. F. signal the main cable must be terminated correctly. Fig. 2 shows a simple use of the principle where a balanced main cable is split into two balanced branch cables each carrying the full audio power but with the carrier power equally divided by a balanced transformer having a ratio of $\sqrt{2}:1$ to each secondary and the matching preserved for the main cable. The winding $L_1$ and $L_2$ are again wound on a common core indicated in dashed lines. Condenser C constitutes the common impedance in series with the balanced windings. The elimination of any R. F. blocking chokes in the system makes the matching problems much simpler, especially in the case of a television carrier where a wide frequency band has to be preserved. Naturally the method can be applied to any feasible number of branch lines still using only a single condenser as the isolating element for the audio signal.

The main features of the system are:

1. A simple means of differentially transforming one of two or more separate signals carried on a common twin or coaxial cable.

2. A method of rendering a transformer ineffective at a particular frequency while still operating normally at others.

3. A method of branching trunk lines on relay systems carrying both audio and carrier signals.

4. A method of providing a simple subscriber's tapping unit for a relay system operating on the above principle.

It is to be understood that it may be possible in certain instances to incorporate the blocking or by-pass condensers in the method of winding the transformer without basically altering the principle of operation.

I claim:

1. Device for splitting a balance twin main cable carrying a relatively low frequency signal and a relatively high frequency signal into a plurality of balanced twin branch cables the impedances of which at said high frequency are matched to that of the main cable, comprising the combination of a step-down transformer which transfers said high frequency signals from said main cable to said branch cables, while preserving the matching between said main cable and said branch cables, said transformer having a primary winding consisting of a first primary part, and a second primary part similar to said first primary part, and a plurality of balanced secondary windings equal in number to the number of branch cables for connection respectively to said branch cables, each of said secondary windings consisting of a first secondary part and a second secondary part similar to said first secondary part, each secondary and each primary winding part having an inner end and an outer end, a core member common to both said primary winding and said secondary windings, means connecting the outer end of each primary winding part respectively to one of the conductors of said balanced twin main cable, means connecting the outer end of each secondary winding part respectively to one of the conductors of one said branch cables, a condenser common to both said primary winding and said secondary windings and connected in series with said windings to the inner ends of said first and second primary winding parts and said first and second secondary winding parts, said primary winding and each of said secondary windings respectively constituting windings balanced about said condenser, and said condenser having a high impedance at the lower frequency signals, said transformer being thereby rendered ineffective as a transformer at said last-mentioned frequencies and the windings thereof serving as direct connections between said main and branch cables, said condenser having a low impedance at said higher frequency signals and thereby rendering said transformer operative for dividing the power of said higher frequency signals available in said main cable between said branch cables.

2. A system for distributing both television video frequency signals and audio frequency signals to a plurality of distribution points, comprising a balanced twin main cable of a constant impedance carrying both television video frequency and audio frequency signals, a plurality of tapping points at intermediate points on said main cable, a plurality of balanced twin distribution cables the impedances of which are matched to that of the main cable at said video frequency for distributing a portion of the power available at said television video frequency and at said audio frequency to each of a plurality of remote points, a step-down transformer connected at each tapping point, each of said transformers having a primary winding consisting of a first primary part, and a second primary part similar to said first primary part, and at least one secondary winding consisting of a first secondary part and a second secondary part similar to said first secondary part, each secondary and each primary winding part having an inner end and an outer end, the number of secondary windings equaling the number of distribution cables connected to the tapping point at which said transformer is connected, and a core member common to both said primary winding and each secondary winding, means connecting the outer end of each primary winding part respectively to one of the conductors of said balanced twin main cable at a tapping point, means connecting the outer end of each secondary winding part respectively to one of the conductors of one of the balanced twin distribution cables connected to the same tapping point, a condenser for each transformer common to both said primary winding and said secondary windings and connected in series with said windings to the inner ends of said first and second primary winding parts and each of said first and second secondary winding parts, said primary winding and each of said secondary windings respectively consitituting winding balanced about said condenser, said condensers having a low impedance to said video frequency signals, each of said transformers being thereby rendered operative as a transformer for transferring a desired fraction of the power available at said video frequency to said at least one distribution cable connected to each transformer, and said condensers having a high impedance to said audio frequency signals, said transformers being thereby rendered ineffective as transformers at said audio frequencies with the windings thereof serving as direct connections to conduct said last-mentioned signals from the main cable to said at least one distribution cable connected to each transformer.

3. A system for distributing radio frequency signals and audio frequency signals, comprising a balanced twin main cable of constant impedance carrying both said radio frequency signals and said audio frequency signals, a tapping at an intermediate point on said main cable, a balanced twin distribution cable for distribution of a portion of the power available at both of said frequencies to a remote point, a step-down transformer having a primary winding consisting of a first primary part, and a second primary part similar to said first primary part, a secondary winding consisting of a first secondary part and a second secondary part similar to said first secondary part, each secondary and each primary winding part having an inner and an outer end, and a core member common to both said primary winding and said secondary winding, means connecting the outer end of each primary winding part respectively to one of the conductors of said balanced twin main cable at said tapping point, means connecting the outer end of each secondary winding respectively to one of the conductors of said balanced twin distribution cable, the impedance of said distribution cable being matched that of said main cable at said radio frequency, an impedance means common to both said primary winding and secondary winding and connected in series with said windings to the inner ends of said first and secondary primary winding parts and said first and second secondary winding parts, said primary winding and secondary winding respectively constituting windings balanced about said impedance means, said impedance means presenting a low impedance to said radio frequency signals, said transformer being thereby rendered operative as a transformer for transferring a desired fraction of the power available at said radio frequency to said distribution cable, and said impedance means presenting a high impedance to said audio frequency signals, said transformer being thereby rendered ineffective as a transformer at said audio frequencies, with the windings thereof serving as direct connections to conduit said audio frequency signals from the balanced main cable to the distribution cable.

4. A system for distributing video frequency signals and audio frequency signals, comprising a balanced twin main cable of constant impedance carrying both said video frequency signals and said audio frequency signals, a tapping at an intermediate point on said main cable, a balanced twin distribution cable for distributing a portion of the power available at both of said frequencies to a remote point, a step-down transformer having a primary winding consisting of a first primary part, and a second primary part similar to said first primary part, a secondary winding consisting of a first secondary part and a second secondary part similar to said first secondary part, each primary and each secondary winding part having an inner and an outer end, and a core member common to both said primary winding and said secondary winding, means connecting the outer end of each primary winding part respectively to one of the conductors of said balanced twin main cable at said tapping point, means connecting the outer end of each secondary winding respectively to one of the conductors of said balanced twin distribution cable, the impedance of said distribution cable being matched to that of said main cable at said video frequency, a condenser common to both said primary winding and secondary winding and connected in series with said windings to the inner ends of said first and secondary primary winding parts and said first and second secondary winding parts, said primary winding and secondary winding respectively constituting windings balanced about said condenser, said condenser presenting a low impedance to said video frequency signals, said transformer being thereby rendered operative as a transformer to transfer a desired fraction of the power available at said video frequencies to said distribution cable, and said condenser presenting a high impedance to said audio frequency signals, said transformer being thereby rendered ineffective as a transformer at said audio frequencies with the windings thereof serving as direct connections to conduct said audio frequency signals from the balanced main cable to the balanced distribution cable.

References Cited in the file of this patent

UNITED STATES PATENTS

| | | |
|---|---|---|
| 1,625,840 | Whittle | Apr. 26, 1927 |
| 2,021,734 | Macalpine | Nov. 19, 1935 |
| 2,037,546 | Six | Apr. 14, 1936 |
| 2,085,434 | Loftis et al. | June 29, 1937 |
| 2,145,548 | Landon | Jan. 31, 1939 |
| 2,190,436 | Steinhausen | Feb. 13, 1940 |
| 2,203,746 | Roosenstein | June 11, 1940 |
| 2,249,502 | Thompson | July 15, 1941 |
| 2,543,973 | Jensen | Mar. 6, 1951 |
| 2,611,895 | Lacey | Sept. 23, 1952 |